Jan. 14, 1930.   C. E. CALLENDER   1,743,315
CONDUIT FITTING
Filed Aug. 4, 1927

Clarence E. Callender
INVENTOR.

BY
ATTORNEYS.

Patented Jan. 14, 1930

1,743,315

UNITED STATES PATENT OFFICE

CLARENCE E. CALLENDER, OF EVANSTON, ILLINOIS, ASSIGNOR TO ERIE MALLEABLE IRON COMPANY, OF ERIE, PENNSYLVANIA, A CORPORATION OF PENNSYLVANIA

CONDUIT FITTING

Application filed August 4, 1927. Serial No. 210,578.

This invention is designed to improve conduit fittings and involves the use of a contractible sleeve which by its contraction clamps a threadless conduit, the sleeve being so directioned as to have its contraction increased with a pull on the conduit. Features and details of the invention will appear from the specification and claim.

A preferred exemplification of the invention is illustrated in the accompanying drawings as follows:—

Figure 1:
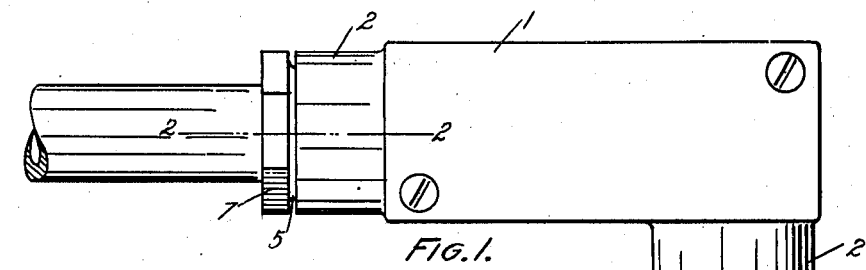

Fig. 1 shows a side elevation of a conduit fitting in the form of a conduit box.

Figure 2:
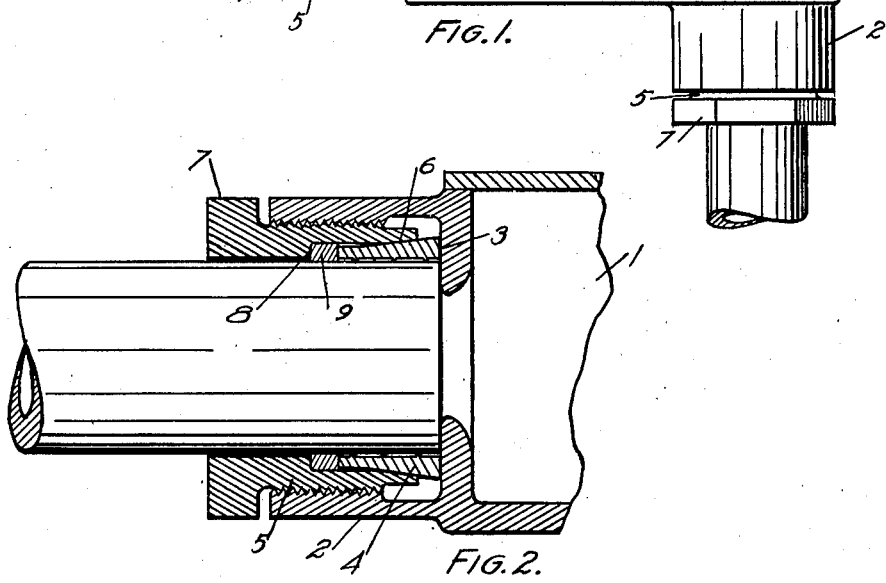

Fig. 2 a section on the line 2—2 in Fig. 1.

Figure 3:
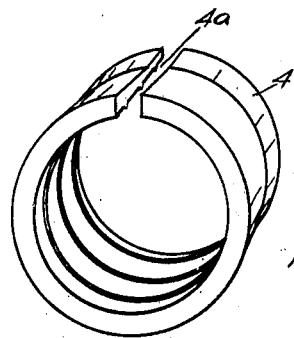

Fig. 3 a perspective view of a contracting sleeve.

1 marks the body of the fitting which, as shown, is in the form of a conduit box. This has an extension 2 which is internally screw-threaded and is provided with a shoulder 3 at its inner end which may operate as a guard shoulder for the end of the conduit but also as a seat for a contractible sleeve 4. The contractible sleeve has a slot 4ᵃ and is tapered or provided with a wedging surface, this wedging surface facing outwardly. A screw 5 is screwed into the extension 2. It has a wedging surface 6 which extends over and engages the wedging surface of the sleeve so that as the screw is turned into the extension the wedging surfaces are brought into engagement and through their action the sleeve is contracted into clamping engagement with the conduit. The screw has a wrench-hold 7 at its outer end by which it may be readily operated.

The screw, it will be seen, has an opening receiving the conduit and this is enlarged for the projecting wedging surface, this enlargement forming a shoulder 8. A packing 9 is arranged between the shoulder 8 and the end of the contracting sleeve and this packing is of compressible material so as to take up variations in the position of the screw to affect the clamping action of the sleeve on the conduit with variations incident to variations in sizes of conduit. It will be noted that any pull on the conduit tending to separate it from the sleeve tends to contract the sleeve and increase its clamping engagement. This is of importance in a fitting of this type.

What I claim as new is:—

In a conduit fitting, the combination of a body having a conduit-receiving screw-threaded extension with an internal shoulder at the inner end of the extension; a slotted contractible sleeve in the opening, said sleeve being seated against the shoulder and having a wedging surface on its outer periphery faced toward its outer end, the outer end of the sleeve having sufficient thickness to form a shoulder on an inserted conduit; a screw operating in the extension, said screw having an opening for receiving a conduit, the opening being enlarged toward the inner end forming a shoulder and the inner end of the enlarged portion engaging the wedging surface of the sleeve; and a gasket between the end of the sleeve and the shoulder formed by the enlargement in the screw.

In testimony whereof I have hereunto set my hand.

CLARENCE E. CALLENDER.